United States Patent [19]
Uota

[11] 3,904,884
[45] Sept. 9, 1975

[54] SEAT BELT OPERATION DETECTOR
[75] Inventor: Kousaku Uota, Himeji, Japan
[73] Assignee: Mitsubishi Denki Kabushiki Kaisha, Tokyo, Japan
[22] Filed: Oct. 29, 1973
[21] Appl. No.: 410,500

[30] Foreign Application Priority Data
Nov. 9, 1972 Japan............................ 47-112354

[52] U.S. Cl........... 307/10 S B; 340/52 E; 340/278; 180/82 C
[51] Int. Cl............................................. B60r 21/10
[58] Field of Search.. 307/10 S B; 340/52 E, 278 A, 340/53; 180/82 C

[56] References Cited
UNITED STATES PATENTS
3,740,711  6/1973  Bell................................ 340/52 E
3,742,448  6/1973  Motz............................... 340/52 E Primary Examiner—Herman Hohauser
Attorney, Agent, or Firm—Oblon, Fisher, Spivak, McClelland & Maier

[57] ABSTRACT

A seat belt operation detector includes a first detector means for actuating at the time of sitting on a seat and a second detector means for actuating at the time of connecting of a seat belt. A flip-flop circuit is charged by the first detector means and the output of the flip-flop circuit in decided in accordance with the condition of the first and second detector means. A process circuit is provided and generates a logical output in accordance with the output of the flip-flop circuit and the second detector.

5 Claims, 3 Drawing Figures 3,904,884

SEAT BELT OPERATION DETECTOR

BACKGROUND OF THE INVENTION

1. Field of the Invention

This invention relates to a seat belt operation detector for confirming the proper use of a safety seat belt facilitated at each seat.

2. Description of the Prior Art

For purposes of safety in the use of a vehicle, such as a car, seat belts are often facilitated therein. However, their use by all drivers and passengers has not been made and accordingly the effective functions of the seat belts have not always been imparted.

In order to increase the rate of use of the seat belts, it has been known to provide the alarm of a buzzer or lamp to inform the driver or passengers of their non-use or to prevent the initiation of the engine when the seat belt is not used.

A further needs exists for a seat belt detector which is highly reliable, simple in construction and which consumes no power when the vehicle is not in use.

SUMMARY OF THE INVENTION

Accordingly, it is an object of this invention to provide a new and improved unique detector for detecting the normal and proper use of a seat belt by detecting a condition of use of the belt by a driver or passenger by detecting the order of connecting of the seat belt after the sitting on a seat.

It is another object of this invention to decrease consumption of electric power when a vehicle is stopped during parking and the like.

Yet one other object of the present invention is the provision of a new and improved unique seat belt operation detector which is of simple circuitry and highly reliable.

Briefly, the foregoing and other objects of the present invention are attained in one aspect by the provision of a seat belt operation detector which includes a first switching means for actuating at the time of sitting on a seat and a second switching means for actuating at the time of connecting of a seat belt. A flip-flop circuit is charged from the first switching means such that the output condition thereof is decided by the condition of the first and second switching means. A processing circuit is further provided and generates a logical output in accordance with the output of the flip-flop circuit and the second switching means to in turn allow or prevent operation of the engine of a vehicle.

BRIEF DESCRIPTION OF THE DRAWINGS

A more complete appreciation of the invention will be readily obtained as the same becomes better understood by reference to the following detailed description when considered in connection with the accompanying drawing wherein.

DETAILED DESCRIPTION OF A PREFERRED EMBODIMENT

Figure 1:
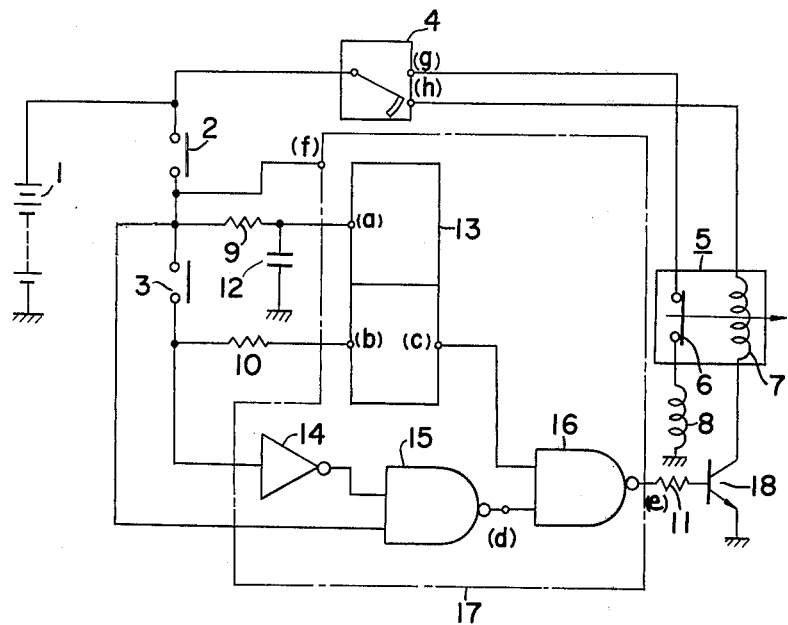
FIG. 1 is a diagram of an electrical circuit of one preferred embodiment of the detector of this invention.

Referring now to the drawings and more particularly to FIG. 1 thereof which shows a diagram of an electrical circuit of one preferred embodiment of the detector of the present invention.

In FIG. 1, the reference numeral (1) designates a power source, such as a battery; and (2) designates an open type seat switch for detecting the seating of a driver or passenger. The numeral (3) designates an open type belt switch for detecting a connection of the seat belt and is connected in series to the seat switch (2) from the power source (1). The numeral (4) designates a key-switch; (5) designates a relay; (6) designates a relay contact; (7) designates an exciting coil of the relay; (8) designates a starter switch coil; (9), (10) and (11) designate respectively resistors; (12) designates a condenser; (13) designates an R-S type flip-flop circuit; (14) designates an NOT circuit; (15) and (16) designate respectively NAND circuits; (17) designates a processing circuit comprising the flip-flop circuit (13), the NOT circuit (14) and the NAND circuits (15), (16); and (18) designates a transistor. The reference (f) designates a power source terminal for supplying power to the processing circuit (17).

Figure 2:
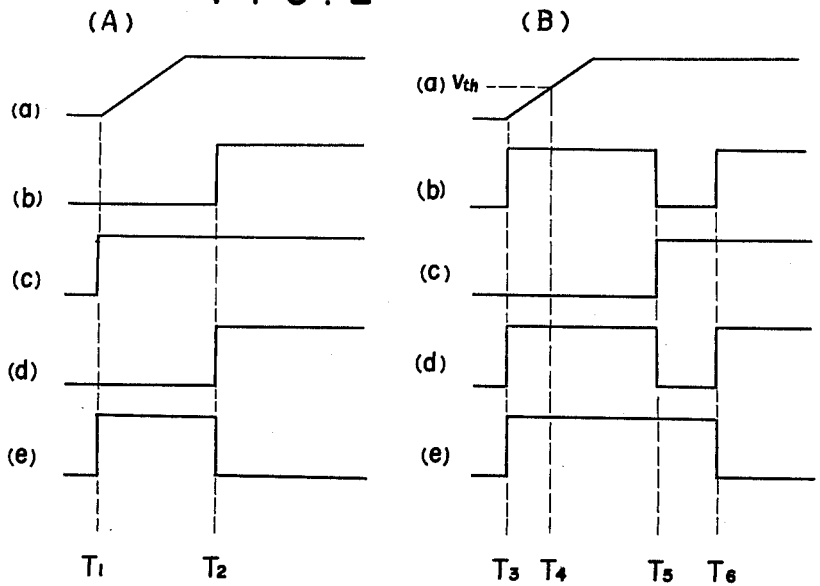
FIGS. 2(A) and 2(B) are respectively time charts for illustrating the electrical circuit of FIG. 1 during normal and abnormal seat belt usage.

The operation of the embodiment set forth above is as follows. When a driver or passenger actually uses the seat belt in a normal fashion, the driver or passenger will first sit and then connect the seat belt. In the normal condition, the open type seat switch (2) is turned on and subsequently the open type belt switch (3) is turned on so that the switches (2) and (3) are actuated. FIG. 2(A) shows a time chart in said condition. When a driver or passenger sits on a seat at a time $T_1$, the open type seat switch (2) is closed and the power source (1) is connected to an electrical power source terminal (f) of the processing circuit (17). The power voltage E from the power source (1) is applied with a delay from the time $T_1$ because of the delay circuit consisting of the resistor (9) and the condenser (12). It should be understood that under normal conditions the seat belt switch (3) is in an OFF condition and will not be connected until the time $T_2$ at which time the input (a) of the flip-flop (13) will have previously reached a logically high value H after the delay time. At this time the input (b) of the flip-flop (13) is at a logically low voltage L, and accordingly, the output (c) is the same as the voltage E, e.g., the logically high voltage H is essentially that of the voltage E. On the other hand, the output (d) of the NAND circuit (15) is of a logically low voltage, because of a synchronization with the output of the belt switch (3), and accordingly, the output (e) of the NAND circuit (16) is of a logically high voltage H. A current is thereby supplied through the resistor (11) to the transistor (18).

When the key-switch (4) is connected to an ignition terminal (h) in said condition, the transistor (18) is turned on and the relay (5) is actuated whereby the closed type relay contact (6) is turned off. When the key-switch (4) is connected to a starter terminal (g), the starter (not shown in drawing) will be not driven because the starter switch coil (8) is disconnected from the power source (1). Accordingly, the engine is not started.

Now, when the seat belt is connected at the time $T_2$ of FIG. 2(A), the open type belt switch (3) is turned on whereby the output (d) of the NAND circuit (15) becomes H. Accordingly, the output of the NAND circuit (16) is L and the transistor (18) is turned off. When the key switch (4) is now connected to the starter terminal (g), the relay coil (7) is not actuated because of the turn-off of the transistor (18), whereby the relay contact (6) is turned on, and the power source (1) is connected to the starter switch coil (8) whereby the starter is driven and the engine is actuated. The above operation exemplifies the case of connecting a seat belt in a normal manner.

On the other hand, it should be understood that since the power source (1) is connected through the seat switch (2) to the processing circuit (17), that when no driver or passenger is in a vehicle such as during parking, the seat switch (2) is turned off whereby no electrical consumption of the power source (1) is made.

FIG. 2(B) shows charts for understanding the conditions during an abnormal use of the seat belt, that is when the seat belt is connected before one sits on a seat; that is the driver or passenger does not use the seat belt, although the seat belt is connected. When the seat belt is connected before being seated, the belt switch (3) is turned on, however the seat switch (2) is turned off whereby the power is not supplied to the processing circuit (17). When the belt switch (3) is turned on and the driver or passenger sits on the seat at the time $T_3$, the seat switch (2) is then turned on. At this time, the input (a) of the flip-flop circuit (13) is delayed as shown by the waveform (a) of FIG. 2(B) by the resistor (9) and the condenser (12). When $T_4$ designates the time for providing the input hold voltage Vth of the flip-flop circuit (13), the input (a) is delayed for the time $T_4 - T_2$ from the input (b) of the flip-flop circuit (13). Accordingly, the input (a) of the flip-flop circuit (13) is L at the time $T_3$, whereby the output (c) is L and the output (e) of the NAND circuit (16) is H which causes an operation condition of the relay (5) as stated above. Accordingly, the starter is not driven even when the key switch (4) is connected by the starter terminal (g), and the engine is not started. When the seat belt is released at the time $T_5$, the output of the flip-flop (13) is H. However, the output (d) of the NAND circuit (15) is L and the output (e) of the NAND circuit (16) is H. Accordingly, again the engine is not started.

If the seat belt is disconnected at the time $T_6$, both of the inputs (c) and (d) of the NAND circuit (16) are respectively H and the output (e) is L. Accordingly, the base of the transistor (18) is not biased and the engine can be started. Also, with the present invention the same operation and results can be accomplished even though the NOT circuit (14) and the NAND circuit (15) are deleted and the output of the belt switch (3) is used as the input of the NAND circuit (16) directly.

As stated above, in accordance with the present invention, it should be apparent that the condition of no connection of a seat belt, which is not a seat belt use, can be readily detected by the simple circuit. Moreover, with the present invention electric consumption can be prevented during parking or other non-use of a vehicle. Accordingly, even when a vehicle is in non-use for a long time, the battery thereof is not discharged. Accordingly, the reliability of the detector is quite increased, because the power is applied only when the vehicle is used. This reliability is quite important for a seat belt which is a safety device for a vehicle.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A vehicle seat belt operation detector comprising:
   a normally open seating detection switch which closes upon seat occupancy,
   a normally open seat belt utilization switch which closes upon seat belt utilization,
   a starter switch which when in a first position permits the vehicle to be started and which when in a second position prevents the vehicle from being started,
   a processing circuit for causing the starter switch to be in its first position when the seat belt utilization switch is closed while the seating detection switch is in its closed position and for causing the starter switch to be in its second position if the seat belt utilization switch is closed prior to the closing of the seating detection switch,
   means connecting the seating detection switch to a power source,
   means connecting the seat belt utilization switch to the power source through the seating detection switch,
   means connecting the processing circuit to the power source through the seating detection switch
   whereby the power source is not drained when the seating detection switch is in its normally open position and
   whereby the vehicle cannot be started unless the seat belt utilization switch is closed while the seating detection switch is in its closed position.

2. A vehicle seat belt operation detector in accordance with claim 1 wherein the process circuit comprises a flip-flop circuit having two inputs and an output, the first input being connected to the power source through an RC circuit and through the seating detection switch, the second input being connected to the power source through the seating detection switch and the seat belt utilization switch, and the output being connected to the starter switch.

3. A vehicle seat belt operation detector in accordance with claim 2 wherein the processing circuit further comprises a NAND gate connected between the output of the flip-flop circuit and the starter switch.

4. A vehicle seat belt operation detector in accordance with claim 3 wherein a NOT gate is connected between the seat belt utilization switch and the input of a NAND gate whose output is connected to the input of the first mentioned NAND gate.

5. A vehicle seat belt operation detector in accordance with claim 1 wherein the starter switch comprises a transistor which conducts when a signal is applied to its base causing a relay to be energized which prevents the application of an electrical signal to the vehicle starter.

* * * * *